United States Patent [19]

Abramovitsh

[11] Patent Number: 5,029,775
[45] Date of Patent: Jul. 9, 1991

[54] AIRCRAFT LANDING GEAR SHORTENING APPARATUS

[75] Inventor: Dan Abramovitsh, Rehovot, Israel

[73] Assignee: Israel Aircraft Industries Ltd., Israel

[21] Appl. No.: 347,248

[22] Filed: May 3, 1989

[30] Foreign Application Priority Data

May 13, 1988 [IL] Israel ........................ 86374

[51] Int. Cl.⁵ .............................................. B64C 25/10
[52] U.S. Cl. .......................... 244/102 R; 244/102 A; 244/102 SL
[58] Field of Search ........ 244/102 SS, 102 a, 102 SL, 244/102 R

[56] References Cited

U.S. PATENT DOCUMENTS

| | | | |
|---|---|---|---|
| 2,292,671 | 8/1942 | Summer et al. | 244/102 SL |
| 2,497,415 | 2/1950 | Parker | 244/102 SL |
| 4,024,800 | 5/1977 | Masclet | 244/102 SL |
| 4,088,286 | 5/1978 | Masclet et al. | 244/102 SL |
| 4,189,117 | 2/1980 | Masclet et al. | 244/102 R |
| 4,199,119 | 4/1980 | Masclet | 244/102 SS |
| 4,433,820 | 2/1984 | Turiot | 244/102 R |
| 4,634,082 | 1/1987 | Kendall | 244/102 R |

FOREIGN PATENT DOCUMENTS

| | | | |
|---|---|---|---|
| 574183 | 4/1959 | Canada | 244/102 SS |
| 988594 | 8/1951 | France | 244/102 SS |
| 1166452 | 10/1958 | France | 244/102 SS |
| 708551 | 5/1954 | United Kingdom | 244/102 SS |
| 731758 | 6/1955 | United Kingdom | 244/102 SS |
| 1011830 | 12/1965 | United Kingdom | 244/102 SS |

Primary Examiner—Joseph F. Peters, Jr.
Assistant Examiner—Christopher P. Ellis
Attorney, Agent, or Firm—Ladas & Parry

[57] ABSTRACT

A self-contained shortening and folding apparatus for retracting aircraft front landing gear, thereby conserving space within the storage bay.

20 Claims, 5 Drawing Sheets

AIRCRAFT LANDING GEAR SHORTENING APPARATUS

FIELD OF THE INVENTION

The present invention relates to aircraft landing gear, and more particularly, to a novel mechanical arrangement providing a self-contained shortening actuator useful in shortening aircraft landing gear during retraction into the landing gear storage bay of an aircraft fuselage such that storage space is conserved.

BACKGROUND OF THE INVENTION

There are known fuselage mounted undercarriages comprising landing gear which can be retracted into the landing gear bay after takeoff and extended for landing purposes. Typically these arrangements include damping means and a collapsible side brace or jack powered by an actuator for providing the retraction and extension motion of the landing gear. There are many types of landing gear that fall within this general description, each being designed to meet differing constraints. Among these constraints are the shape of the fuselage, the available anchor points for the landing gear, the weight of the aircraft, its capacity and the type of duty to which it is subjected.

Several known construction attempt to minimize the volume that the undercarriage occupies in its retracted position in the storage bay.

Examples of this construction are provided by U.S. Pat. No. 4,189,117 to Masclet et al., wherein a hydraulic maneuvering and wind bracing jack is provided for controlling the extended and retracted positions of the landing gear. The jack provides a single means of lowering and retracting the undercarriage, and it is mounted so as to minimize the required storage bay height.

U.S. Pat. No. 4,199,119 discloses a hydraulic retraction jack pivoted on the undercarriage leg casing and fixed to the aircraft for lifting and extending the landing gear. A rod of fixed length having one end fixed to the wing is mounted at its other end via a lever to the shock absorber so as to cause shortening of the undercarriage upon retraction, thus reducing the required storage bay length.

U.S. Pat. No. 4,433,820 discloses a jack for collapsing a side brace which supports the undercarriage so as to enable retraction and extension thereof during take-off and landing. By virtue of parallel pivot axes for the jack and the undercarriage, the volume occupied by the retracted undercarriage is of minimal thickness.

The problem with all of the above systems is that because they use an actuator which is external to the landing gear for retracting it, the external actuator occupies a lot of storage bay space.

Therefore, it would be desirable to provide a landing gear construction which minimizes the space required in the storage bay.

SUMMARY OF THE INVENTION

Accordingly, it is a principal object of the present invention to provide a self-contained shortening and folding apparatus for retracting front landing gear, thereby conserving space within the storage bay.

In accordance with a preferred embodiment of the present invention, there is provided aircraft front landing gear shortening apparatus comprising:

outerbody housing apparatus pivotably mounted at an upper end thereof to the aircraft fuselage;

piston apparatus slidably contained within the outerbody housing means and having a landing wheel mounted on an extended end thereof;

actuator apparatus self-contained within the outerbody housing means and operative to withdraw the piston means extended end therewithin during a shortening motion thereof;

interlocking apparatus attached to the outerbody housing apparatus at the lower end thereof and having a limiting cam adjustable in relation to the piston means shortening motion; and a foldable side brace pivotably extending from the aircraft fuselage and engaging the interlocking apparatus for governing movement of the outerbody housing apparatus during a storage bay retraction motion, adjustment of the limiting cam in a clearance position upon completion of a predetermined sliding tube shortening motion enabling completion of the storage bay retraction motion.

In the preferred embodiment, the inventive landing gear is provided with a self-contained shortening actuator integrated within the outerbody housing which comprises a shock absorber. The self-contained shortening actuator is contained within a jacket enclosed by the outerbody housing, and comprises a slide bearing and a pair of internal sleeves sealed by O-rings. The internal construction of the piston is such that the self-contained shortening actuator conducts the hydraulic fluid in the jacket between the sleeves, to control shortening and retraction operations.

An interlocking mechanism external to the outerbody housing provides a mechanical timing sequence to ensure that the piston has been sufficiently shortened before completion of the landing gear retraction motion. The mechanism for ensuring shortening prior to retraction is operative upon commencement of the landing gear pivot about the fuselage during retraction. An elbow arrangement associated with the piston shortening motion adjusts a limiting cam which interferes with continued retraction motion governed by the foldable side brace. When sufficient shortening has been achieved, the elbow itself comes to a sharp V and the limiting cam is cleared, permitting continued retraction of the landing gear into the storage bay.

In accordance with the invention, the provision of the self-contained shortening actuator achieves shortening of the piston without requiring an externally mounted actuator, thereby conserving storage space once the landing gear has been retracted into the storage bay.

Another feature of the design is that the piston-type landing gear has a pair of cam shaped surfaces on the internal sleeves which guarantee that upon extension it is properly oriented so that the landing gear wheel cannot be turned in a direction other than that of the aircraft. These surfaces are S-shaped and provide a positive unique orientation of the piston.

Other features and advantages of the invention will become apparent from the drawings and the description contained hereinbelow.

BRIEF DESCRIPTION OF THE DRAWINGS

For a better understanding of the present invention with regard to the embodiments thereof, reference is made to the accompanying drawings in which like numerals designate corresponding elements or sections throughout, and in which.

DETAILED DESCRIPTION OF A PREFERRED EMBODIMENT

Figure 1:
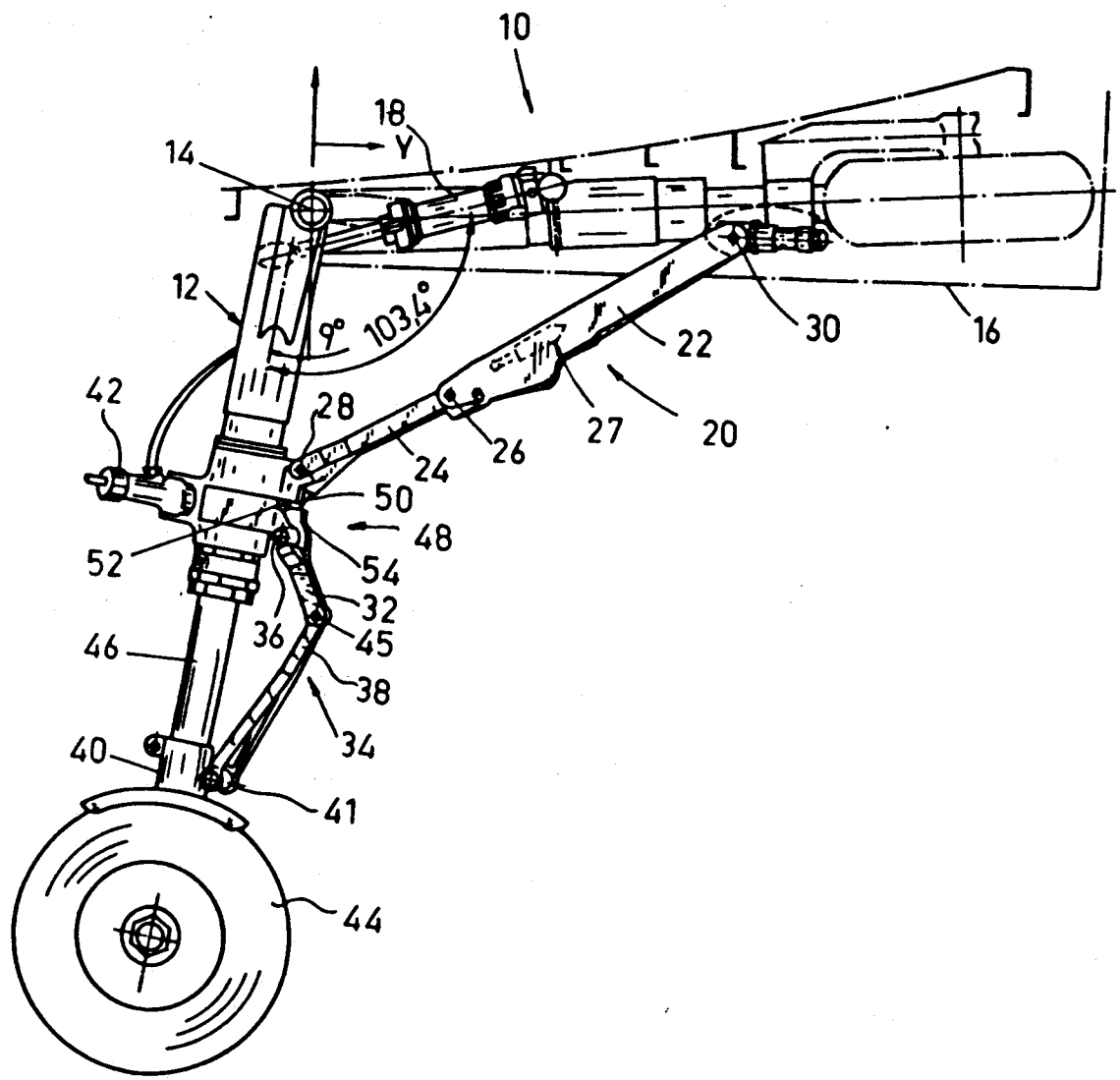
FIG. 1 is an overall view showing the landing gear of the present invention in an extended position at the commencement of a retraction operation.

Referring now to FIG. 1, there is shown an overall view of a piston-type aircraft landing gear 10 constructed and operative in accordance with the principles of the present invention. An outerbody housing 12 comprising a shock absorber is pivotably mounted at point 14 to the aircraft fuselage (not shown) to allow for retraction motion from the fully extended position of FIG. 1 to a stored position in an aircraft storage bay, shown within the area defined by line 16. An actuator 18 attached to the aircraft fuselage controls retraction motion of outerbody 12 in response to the operation of a hydraulic system included in the aircraft control system design.

A foldable side brace 20 comprises upper and lower sections 22 and 24 provided by a pair of articulating levers pivotably connected at a joint 26 whereat a brace lock/unlock actuator 27 controls the locking and unlocking procedure. At point 28, the lower section 24 is pivotably connected to outerbody housing 12, and the upper section 22 is pivotably connected to the aircraft fuselage at point 30. An upper portion 32 of a foldable scissors brace 34 is pivotably attached to outerbody housing 12 at point 36, and the lower portion 38 is pivotably attached to the wheel housing 40 at point 41. Steering power is transferred from a steering actuator 42 to the landing gear wheel 44 by scissors brace 34 which is foldable at point 45.

Outerbody housing 12 has contained therein an extendible sliding tube 46 at one end of which wheel housing 40 is mounted. The piston-type operation of landing gear 10 is provided through withdrawal of the extended end of sliding tube 46 into outerbody housing 12 upon operation of a self-contained shortening actuator (see FIGS. 2A, 3 and 4).

In accordance with the present invention, in order to mechanically ensure that the shortening motion of sliding tube 46 occurs prior to completion of the landing gear retraction operation into storage bay 16, an interlocking mechanism 48 is provided on outerbody housing 12. Interlocking mechanism 48 comprises a roller bearing 50 on lower section 24 of foldable side brace 20, and opposite cams 52, 54 on upper portion 32 of scissors brace 34, all as illustrated in FIGS. 2B-2D. Interlocking mechanism 48 also insures that during deployment of landing gear 10, extension of sliding tube 46 cannot occur prior to exit from storage bay 16.

Figure 2A:
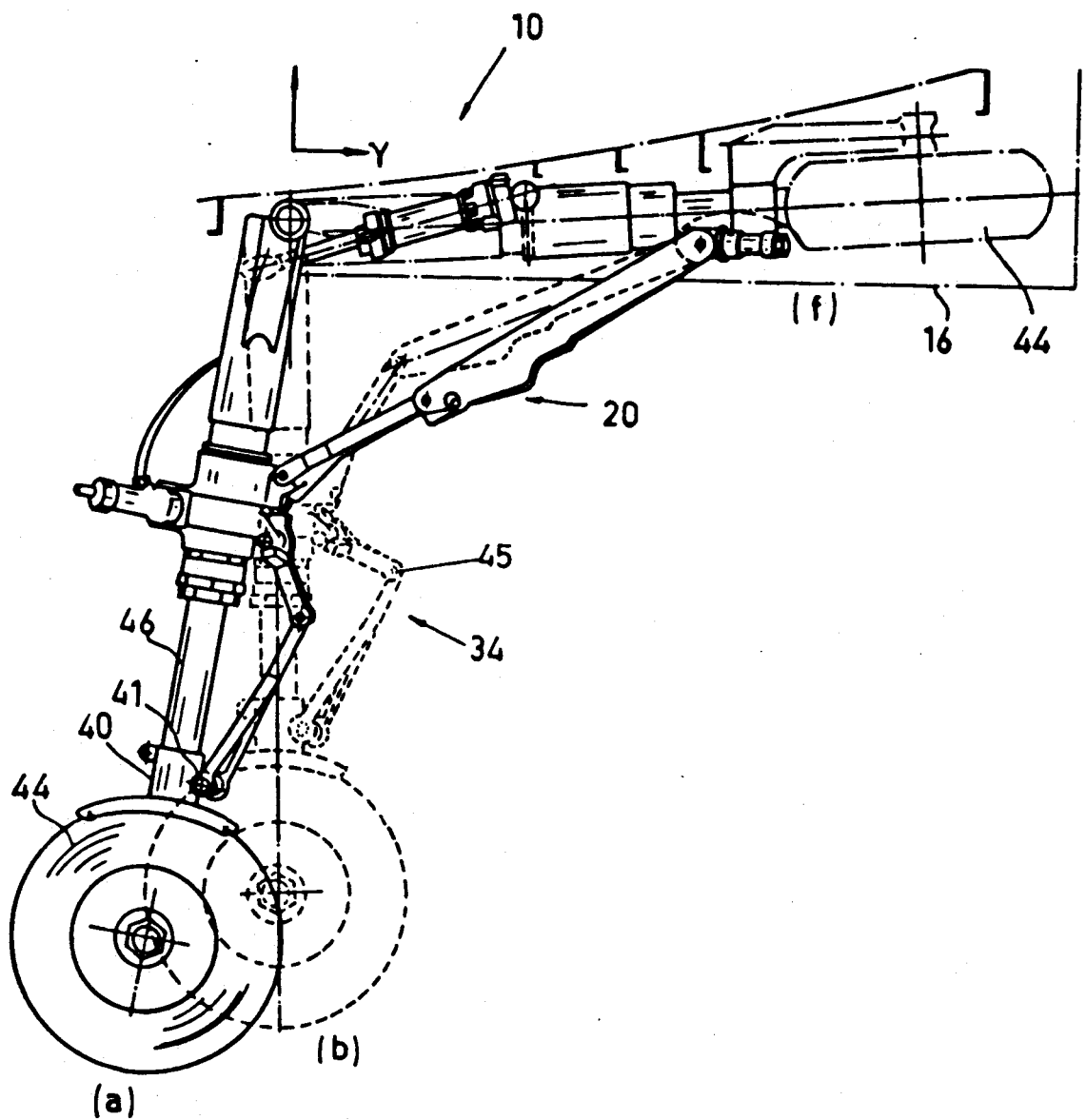
FIG. 2A shows the inventive landing gear of FIG. 1 in different operative positions.
Figure 2B:
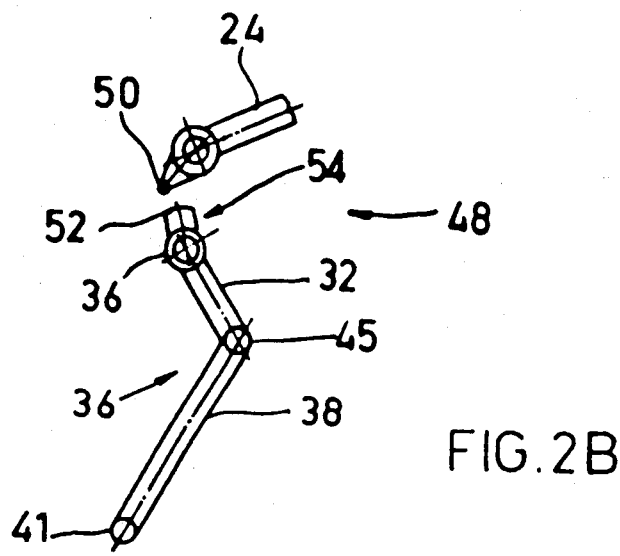
FIGS. 2B-2D show successive positions of an interlocking mechanism operative during said shortening motion.
Figure 2C:
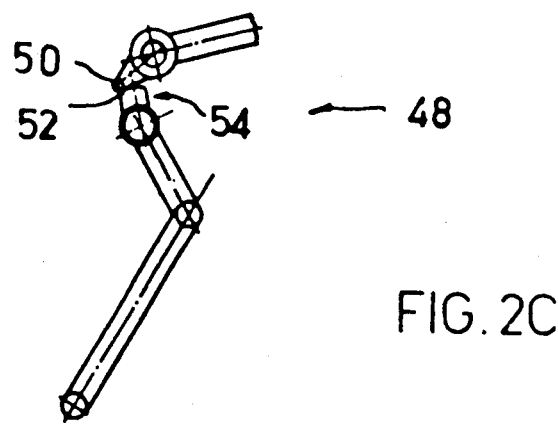
Figure 2D:
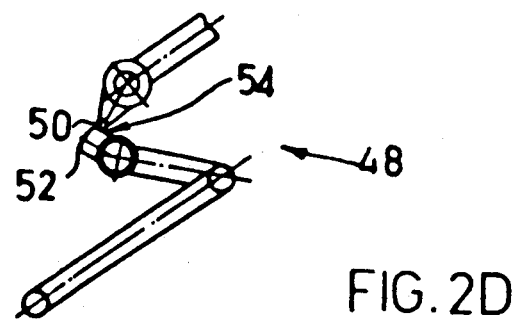

Referring now to FIG. 2A, the retraction operation of landing gear 10 is shown in stages beginning with the fully extended position depicted by solid lines and corresponding to the view in FIG. 1, followed by the position, depicted by broken lines, immediately after shortening has occurred. Referring additionally to FIGS. 2B-2D the operation of interlocking mechanism 48 is illustrated during progressively advanced stages of retraction. Depicted by chain-dotted lines is the landing gear 10 after complete retraction thereof into storage bay 16. When actuator 18 commences the retraction operation, the shortening motion of sliding tube 46 is also commenced by the operation of the self-contained shortening actuator in outerbody housing 12, as further described herein.

In accordance with the principles of the present invention, interlocking mechanism 48 is designed to ensure that a sufficient amount of shortening is achieved by sliding tube 46 motion prior to completion of the retraction operation. For this purpose, opposite cams 52 and 54 and roller bearing 50 (FIG. 2B) are arranged to interfere during continued sliding tube 46 motion (FIG. 2C), as wheel housing 40 and point 41 approach outerbody housing 12.

When scissors brace 34 adjusts to form a sharper V at point 45 (FIG. 2D), roller bearing 50 clears the corner of cam 52 on upper section 32 of foldable scissors brace 34, enabling the retraction operation to continue. This clearance operation is designed to occur just as the retraction operation reaches an advanced stage, allowing it to be completed smoothly via a mechanical arrangement which twists landing gear wheel 44 as it enters storage bay 16.

If, for some reason, the shortening motion of sliding tube 46 is insufficient at this stage of the retraction operation, continued retraction motion of landing gear 10 would be likely to damage storage bay 16. The mechanical timing sequence provided by interlocking mechanism 48 avoids this possibility by limiting continuation of the retraction operation until the clearance operation occurs.

Once completely retracted into storage bay 16 as shown in chain-dotted outline in FIG. 2A, interlocking mechanism 48 prevents extension of sliding tube 46 during deployment of landing gear 10 until roller bearing 50 on the lower section 24 of foldable side brace 20 clears cam 54 sufficiently. This prevents premature extension of sliding tube 46 while landing gear 10 has not completely exited storage bay 16.

Figure 3:
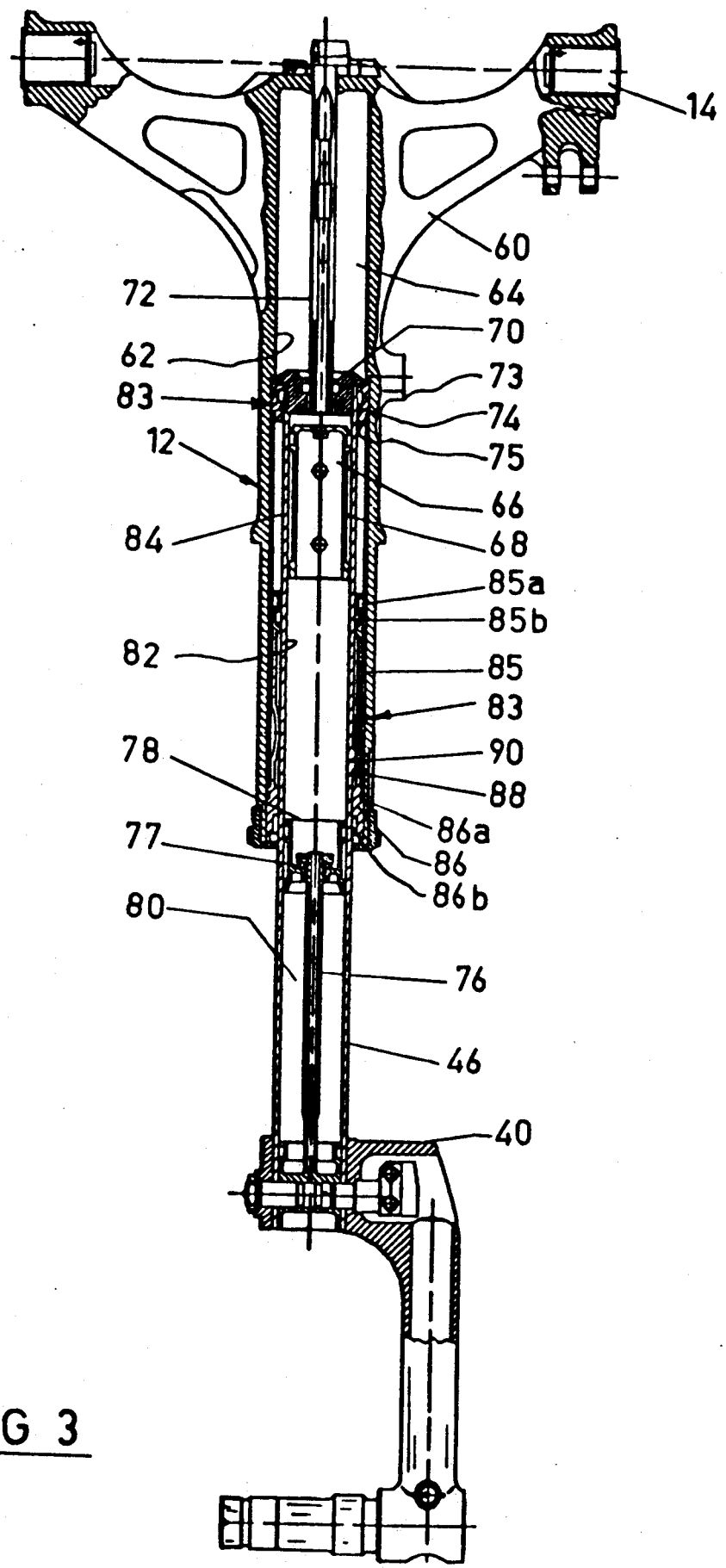
FIG. 3 shows a cross-section of the landing gear housing when in an extended position.
Figure 4:
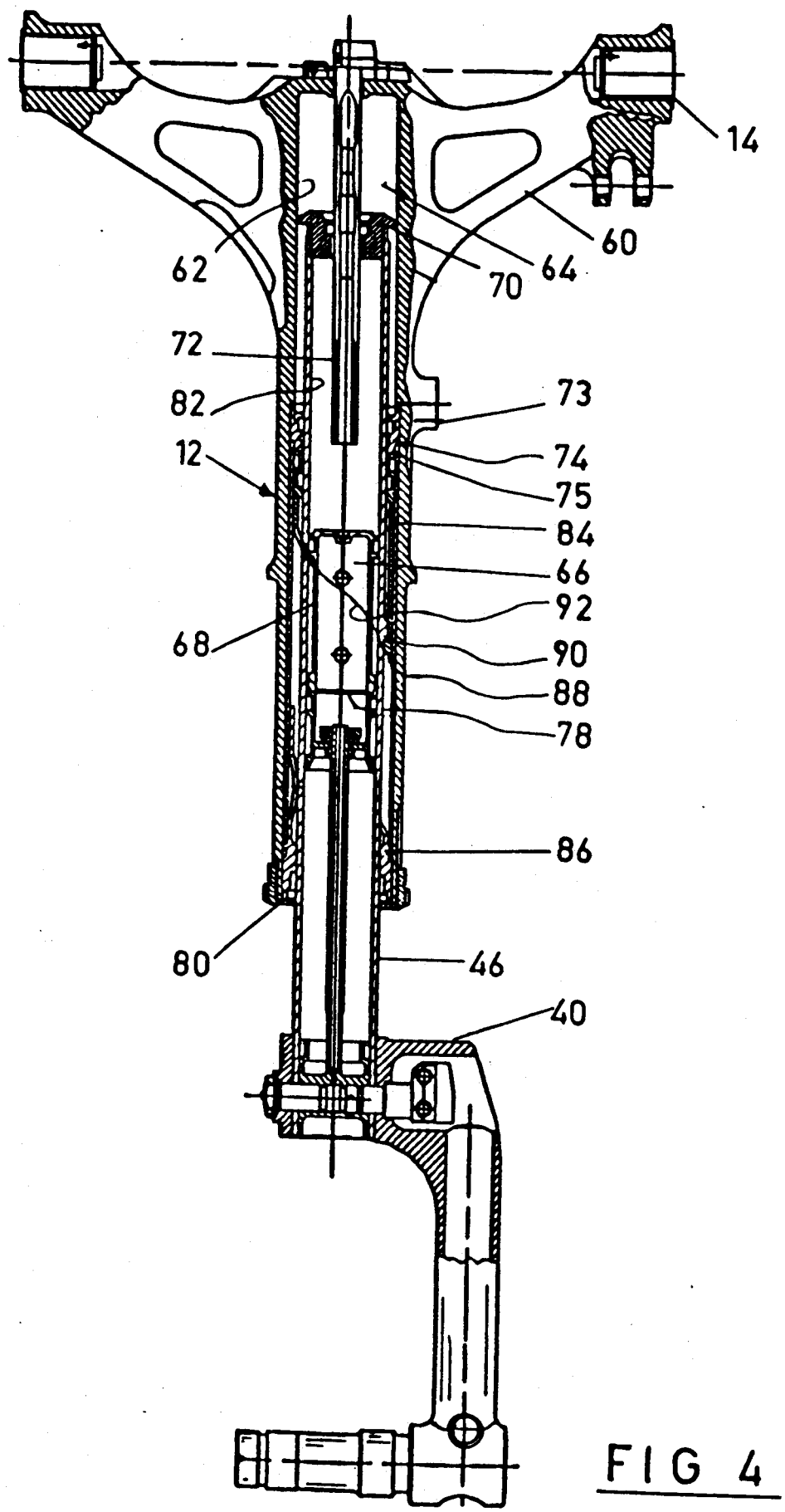
FIG. 4 shows the landing gear housing once the shortening motion has been completed prior to final retraction.

Turning now to FIG. 3, there is shown a cross-sectional view of outerbody housing 12 of landing gear 10 when in a fully extended position. Outerbody housing 12 is pivotably supported in region 60 from the aircraft fuselage at point 14. The cylindrical inner wall of housing 12 provides a jacket 62 within which there is enclosed an oleo-pneumatic shock absorber comprising two chambers, an oil chamber 64 and an air chamber 66 which are separated by a sliding piston 68.

The upper end of sliding tube 46 is sealed by a cap 70 having a central bore which is centered on a metering pin 72 extending vertically within jacket 62 for a portion of the overall length of outerbody housing 12. Seated within jacket 62 opposite an inlet port 73 in housing 12 is a cylindrical slide bearing 74 which guides the sliding motion of sliding tube 46 vertically upward during shortening. The lower face 75 of slide bearing 74 provides an upper limit on the shortening motion of sliding tube 46 as will be described further herein.

The lower end of sliding tube 46 contains an internal column brace 76 which is anchored at wheel housing 40. A separating piston 77 between air chamber 66 and air chamber 80 slides on column brace 76. Sliding piston 68 is slidably movable along the inner surface 82 of the wall defining sliding tube 46, between cap 70 and upper face 78 of piston 77.

A self-contained shortening actuator 83 is located in the space 84 between jacket 62 and sliding tube 46, and comprises slide bearing 74 and a pair of cylindrical upper and lower sleeves 85 and 86. Sleeves 85 and 86 are sealed in jacket 62 by O-rings 85a–b and 86a–b, and have cam-shaped edges which interface with a unique orientation to maintain a "zero" landing gear wheel 44 position when sliding tube 46 is fully extended as shown. Upper sleeve 85 has a shoulder 88 which is retained by key 90 formed in the wall of sliding tube 46.

In operation, to retract landing gear 10 from its extended position, hydraulic fluid under pressure is injected simultaneously into landing gear 10 extension/retraction actuator 18, the brace lock/unlock actuator 27, and the self-contained shortening actuator 83 via inlet port 73. This causes shortening and retraction operations to commence simultaneously.

Referring now to FIGS. 2B to 2D and 4, as landing gear 10 is retracted, roller bearing 50 bottoms against cam 52, thus interfering with continued retraction. Hydraulic pressure builds up between the O-ring seals 85a–b and 86a–b of respective upper and lower sleeves 85 and 86, causing upper sleeve 85 to travel upward until it bottoms against the lower face 75 of slide bearing 74. Because it is mechanically retained by key 90 in upper sleeve 85, sliding tube 46 travels upward along with upward travel of sleeve 85. This shortens landing gear 10 as hydraulic fluid flows past cap 70 and forces piston 68 to slide on wall 82, thereby compressing the air in air chamber 66.

When the shortening motion is completed, roller bearing 50 is positioned against cam 54 on upper portion 32 of scissors brace 34 and rolls on its surface, reactivating retraction of landing gear 10 until completion, as shown in FIGS. 2A and 2D. At this point, hydraulic pressure is cut off and the compressed air in air chamber 66 pushes against piston 68, causing sliding tube 46 to be extended slightly until cam 54 bottoms against roller bearing 50, thereby providing a mechanical lock while landing gear 10 is in storage bay 16.

Landing gear 10 deployment is controlled by hydraulic pressure applied to actuator 18, whereupon landing gear 10 partially extends from storage bay 16 as roller bearing 50 rolls on the surface of cam 54, maintaining the shortened configuration of sliding tube 46. When roller bearing 50 reaches the corner of cam 54, sliding tube 46 is permitted to slide out to its fully extended position (FIG. 3) where upper cylindrical sleeve 85 bottoms against lower cylindrical sleeve 86.

As described earlier, a pair of cam-shaped edges on respective upper and lower cylindrical sleeves 85 and 86 maintain "zero" wheel position when these sleeves are in contact. The cam-shaped edge 92 associated with upper cylindrical sleeve 85 can be seen in FIG. 4 as it is raised from lower cylindrical sleeve 86 during shortening motion of sliding tube 46.

Once fully extended, sliding tube 46 moves in and out of outerbody housing 12 based on the operation of the shock absorber construction whereby oil chamber 64 provides damping. Once the aircraft load is placed on landing gear wheel 44, sliding tube 46 will move within outerbody housing 12. Since the sliding tube 46 is retained to upper sleeve 85 by key 90, the cam-shaped edge 92 of upper sleeve 85 will be separated from lower sleeve 86 by motion of sliding tube 46. This permits steering power to direct landing gear wheel 44 for maneuvering the aircraft.

In summary, it will be appreciated that by operation of the mechanical interlocking mechanism 48, the proper sequence of operation upon shortening and retraction of landing gear 10 is ensured before complete retraction into storage bay 16. A mechanical lock is maintained while landing gear 10 is in storage, and is released only after it has cleared storage bay 16 upon deployment.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

I claim:

1. Hydraulic front landing gear shortening apparatus for an aircraft comprising:
   outerbody housing means having a closed upper end and an open lower end and being pivotably mounted at said upper end thereof to the aircraft fuselage;
   piston means slidably contained within said outerbody housing means and having a landing wheel mounted onto a free end thereof protruding from said lower end of said outerbody housing means;
   hydraulic actuator means contained within said outerbody housing means and operative, in response to application thereto of a hydraulic control pressure, to at least partially withdraw said free end of said piston means within said outerbody housing means producing a shortening motion of said piston means, when the landing gear is not loaded;
   interlocking means attached to said outerbody housing means at said lower end thereof and having a limiting cam whose position is adjustable in response to said shortening motion of said piston means; and
   a foldable side brace pivotably extending from the aircraft fuselage and engaging said interlocking means for governing movement of said outerbody housing means during a retraction motion of the landing gear into a storage bay,
   adjustment of said limiting cam in a clearance position upon completion of a predetermined shortening motion of said piston means enabling completion of said retraction motion of the landing gear.

2. The apparatus of claim 1 wherein said outerbody housing means comprises an oleo-pneumatic shock absorber.

3. The apparatus of claim 1 wherein said piston means comprises a sliding tube.

4. The apparatus of claim 2 wherein said piston means comprises a sliding tube.

5. The apparatus of claim 1 wherein a shoulder is formed within said piston means and said actuator means comprises:
   jacket means defining an inner wall of said outerbody housing means;
   a hydraulic fluid inlet port located in a wall of said jacket means; and
   cylindrical sleeve means slidably movable within said jacket means, arranged in fluid communication with said inlet port and operative to move in a predetermined shortening direction in response to the application thereto of a hydraulic pressure via said port, said sleeve means also including key retaining means configured to engage said shoulder of said piston means such that said motion of said sleeve means in said predetermined shortening direction causes said shortening motion of said piston means in response to said application of a hydraulic pressure at said port.

6. The apparatus of claim 2 wherein a shoulder is formed within said piston means and said actuator means comprises:
jacket means defining an inner wall of said outerbody housing means;
a hydraulic fluid inlet port located in a wall of said jacket means; and
cylindrical sleeve means slidably movable within said jacket means, arranged in fluid communication with said inlet port and operative to move in a predetermined shortening direction in response to the application thereto of a hydraulic pressure via said port, said sleeve means also including key retaining means configured to engage said shoulder of said piston means such that said motion of said sleeve means in said predetermined shortening direction causes said shortening motion of said piston means in response to said application of a hydraulic pressure at said port.

7. The apparatus of claim 3 wherein a shoulder is formed within said piston means and said actuator means comprises:
jacket means defining an inner wall of said outerbody housing means;
a hydraulic fluid inlet port located in a wall of said jacket means; and
cylindrical sleeve means slidably movable within said jacket means, arranged in fluid communication with said inlet port and operative to move in a predetermined shortening direction in response to the application thereto of a hydraulic pressure via said port, said sleeve means also including key retaining means configured to engage said shoulder of said piston means such that said motion of said sleeve means in said predetermined shortening direction causes said shortening motion of said piston means in response to said application of a hydraulic pressure at said port.

8. The apparatus of claim 5 wherein said cylindrical sleeve means comprises upper and lower sleeves having cam-shaped mutually engageable edges, contact between said cam-shaped edges determining a unique orientation of the landing wheel of the aircraft.

9. The apparatus of claim 6 wherein said cylindrical sleeve means comprises upper and lower sleeves having cam-shaped mutually engageable edges, contact between said cam-shaped edges determining a unique orientation of the landing wheel of the aircraft.

10. The apparatus of claim 7 wherein said cylindrical sleeve means comprises upper and lower sleeves having cam-shaped mutually engageable edges, contact between said cam-shaped edges determining a unique orientation of the landing wheel of the aircraft.

11. The apparatus of claim 1 wherein said interlocking means comprises a scissors brace operable in association with said shortening motion of said piston means, said scissors brace having said limiting cam mounted at one end thereof for engagement with a roller bearing mounted at an end of said foldable side brace, such that said bearing rolls on the surface of said limiting cam when said clearance position is achieved.

12. The apparatus of claim 1 wherein said retraction of the landing gear motion is provided by an external acutuator.

13. The apparatus of claim 5 wherein an air chamber is defined within said jacket means between an end wall thereof and said piston means, the air in said air chamber being compressed during said shortening motion so as to force a slight extension of said piston means upon completion of said retraction motion, thereby mechanically locking said interlocking means during containment in the storage bay.

14. The landing gear of claim 1 wherein said piston means is maintained in a shortened position during deployment until after a predetermined extension of said foldable side brace upon exit from the storage bay.

15. A method of shortening aircraft front landing gear apparatus during retraction thereof into a storage bay, wherein said landing gear comprises front landing gear shortening apparatus including:
outerbody housing means having a closed upper end and an open lower end and being pivotably mounted at said upper end thereof to the aircraft fuselage;
piston means slidably contained within said outerbody housing means and having a landing wheel mounted onto a free end thereof protruding from said lower end of said outerbody housing means;
hydraulic actuator means contained within said outerbody housing means and operative, in response to application thereto of a hydraulic control pressure, to at least partially withdraw said free end of said piston means within said outerbody housing means producing a shortening motion of said piston means, when the landing gear is not loaded;
interlocking means attached to said outerbody housing means at said lower end thereof and having a limiting cam whose position is adjustable in response to said shortening motion of said piston means; and
a foldable side brace pivotably extending from the aircraft fuselage and engaging said interlocking means for governing movement of said outerbody housing means during a retraction motion of the landing gear into a storage bay,
adjustment of said limiting cam in a clearance position upon completion of a predetermined shortening motion of said piston means enabling completion of said retraction motion of the landing gear,
said method comprising the steps of:
at least partially retracting the landing gear via a mechanical linkage;
hydraulically shortening the landing gear during said step of at least partially retracting, and while the landing gear is not loaded;
mechanically limiting continued retraction;
sensing completion of a predetermined landing gear shortening motion;
removing said mechanical interference once completion of said predetermined shortening motion is sensed; and
completing the retraction of the landing gear into the storage bay upon removal of said mechanical interference.

16. The method of claim 15 wherein said steps of at least partially retracting and of hydraulically shortening are performed simultaneously and said mechanically limiting step is performed after retraction of the landing gear by a predetermined amount.

17. The method of claim 15 wherein said step of mechanically limiting includes the step of generating a residual pressure thereby maintaining a mechanical lock on the landing gear after completion of said retraction of the landing gear.

18. The method of claim 16 wherein said step of mechanically limiting includes the step of generating a residual pressure thereby maintaining a mechanical lock on the landing gear after completion of said retraction thereof.

19. The method of claim 15 wherein upon deployment of the landing gear, a unique orientation of the wheel of the aircraft is determined prior to application of the aircraft weight thereto.

20. An aircraft front landing gear shortening apparatus operating in accordance with the method of claim 15.

* * * * *